United States Patent
Nakai et al.

(10) Patent No.: US 10,461,571 B2
(45) Date of Patent: Oct. 29, 2019

(54) CHARGING CIRCUIT AND MODULE USING THE SAME

(71) Applicant: Murata Manufacturing Co., Ltd., Nagaokakyo-shi, Kyoto-fu (JP)

(72) Inventors: Yasuharu Nakai, Nagaokakyo (JP); Masaharu Itaya, Nagaokakyo (JP); Yusuke Yoshida, Nagaokakyo (JP); Yasuhiro Kuratani, Nagaokakyo (JP); Masako Tenpaku, Nagaoakakyo (JP); Yoshifumi Wada, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 209 days.

(21) Appl. No.: 15/262,214

(22) Filed: Sep. 12, 2016

(65) Prior Publication Data

US 2016/0380474 A1 Dec. 29, 2016

Related U.S. Application Data

(63) Continuation of application No. PCT/JP2015/054936, filed on Feb. 23, 2015.

(30) Foreign Application Priority Data

Mar. 14, 2014 (JP) .................. 2014-052290

(51) Int. Cl.
*H02J 7/00* (2006.01)
*H02J 7/14* (2006.01)
(Continued)

(52) U.S. Cl.
CPC ........... *H02J 7/355* (2013.01); *H01M 10/425* (2013.01); *H01M 10/4285* (2013.01);
(Continued)

(58) Field of Classification Search
USPC ....... 320/101, 103, 134, 135, 136, 107, 128, 320/113, 137, 104, 124, 130
See application file for complete search history.

(56) References Cited

U.S. PATENT DOCUMENTS 5,438,225 A   8/1995  Berger
6,316,145 B1 * 11/2001 Kida ..................... H01M 4/48
                                                 429/218.1

(Continued)

FOREIGN PATENT DOCUMENTS

JP   S61-94129 A    5/1986
JP   H07-140185 A   6/1995
(Continued)

OTHER PUBLICATIONS

International Search Report issued for PCT/JP/2015/054936, dated May 19, 2015.

(Continued)

*Primary Examiner* — Alexis B Pacheco
(74) *Attorney, Agent, or Firm* — Arent Fox LLP

(57) ABSTRACT

A module includes a charging circuit and a driven unit. The charging circuit includes a power generation element and an electric storage element. The power generation element is connected to the electric storage element to charge the electric storage element. The electric storage element is connected to the driven unit to drive the driven unit with electric power stored. The power-generating voltage of the power generation element has a value equal to or more than the charging voltage of the electric storage element. The electric storage element is a secondary battery including a lithium-transition metal oxide in a positive electrode active material layer, and a lithium-titanium oxide of spinel-type crystal structure in a negative electrode active material layer.

11 Claims, 8 Drawing Sheets

(51) Int. Cl.
*H02J 7/35* (2006.01)
*H01M 10/46* (2006.01)
*H01M 10/42* (2006.01)
*H01M 4/485* (2010.01)
*H01M 4/505* (2010.01)
*H01M 4/525* (2010.01)
*H01M 4/58* (2010.01)
*H01M 10/0525* (2010.01)
*H02J 7/34* (2006.01)

(52) U.S. Cl.
CPC ......... *H01M 10/465* (2013.01); *H02J 7/0029* (2013.01); *H02J 7/35* (2013.01); *H01M 4/485* (2013.01); *H01M 4/505* (2013.01); *H01M 4/525* (2013.01); *H01M 4/5825* (2013.01); *H01M 10/0525* (2013.01); *H01M 2010/4278* (2013.01); *H02J 7/345* (2013.01); *Y02E 60/122* (2013.01)

(56) References Cited

U.S. PATENT DOCUMENTS

| | | | |
|---|---|---|---|
| 7,722,989 B2 | 5/2010 | Ohzuku et al. | |
| 7,976,975 B2 | 7/2011 | Ajiki | |
| 8,432,124 B2* | 4/2013 | Foster | A45C 11/00 320/101 |
| 2003/0128010 A1* | 7/2003 | Hsu | H02J 7/355 320/101 |
| 2005/0147889 A1 | 7/2005 | Ohzuku et al. | |
| 2006/0216600 A1 | 9/2006 | Inagaki | |
| 2008/0057355 A1 | 3/2008 | Ajiki | |
| 2008/0297106 A1* | 12/2008 | Toya | H01M 10/465 320/107 |
| 2009/0007958 A1* | 1/2009 | Ho | H01M 10/465 136/245 |
| 2009/0072780 A1 | 3/2009 | Lee | |
| 2009/0160396 A1* | 6/2009 | Shyu | H01M 14/005 320/101 |
| 2011/0050416 A1 | 3/2011 | Lee | |
| 2011/0074337 A1* | 3/2011 | Adachi | H01M 10/465 320/101 |
| 2011/0200855 A1* | 8/2011 | Watanabe | H01L 31/02021 429/80 |
| 2013/0095367 A1 | 4/2013 | Kim | |
| 2013/0122362 A1 | 5/2013 | Sato et al. | |
| 2013/0127392 A1* | 5/2013 | Rugolo | H02J 7/0042 320/101 |
| 2013/0337320 A1* | 12/2013 | Yukawa | H01M 4/0435 429/211 |
| 2014/0004412 A1* | 1/2014 | Ogino | H01M 4/405 429/199 |
| 2014/0197802 A1* | 7/2014 | Yamazaki | H02J 7/0052 320/137 |
| 2017/0033364 A1 | 2/2017 | Kim | |

FOREIGN PATENT DOCUMENTS

| | | |
|---|---|---|
| JP | H08340640 A | 12/1996 |
| JP | H10304585 A | 11/1998 |
| JP | H10312826 A | 11/1998 |
| JP | H11-74002 A | 3/1999 |
| JP | 2003-8958 A | 1/2003 |
| JP | 2005-142047 A | 6/2005 |
| JP | 2010080211 A | 4/2010 |
| JP | 2010080312 A | 4/2010 |
| JP | 2010-165688 A | 7/2010 |
| JP | 2010-206912 A | 9/2010 |
| JP | 2010205663 A | 9/2010 |
| JP | 2012-139008 A | 7/2012 |
| JP | 2013-48532 A | 3/2013 |
| JP | 2013534704 A | 9/2013 |
| JP | WO2012014780 A1 | 9/2013 |
| JP | 2014158379 A | 8/2014 |

OTHER PUBLICATIONS

Written Opinion of the International Searching Authority issued for PCT/JP/2015/054936, dated May 19, 2015.

* cited by examiner

FIG. 6 ( A )
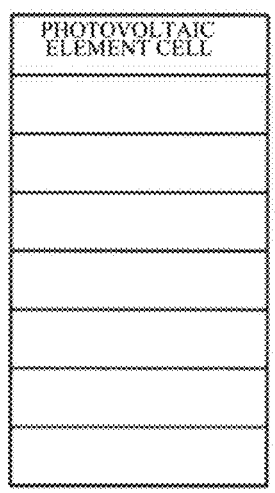
FIG. 6 ( B )
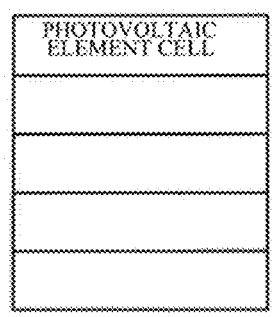
FIG. 6 ( C )
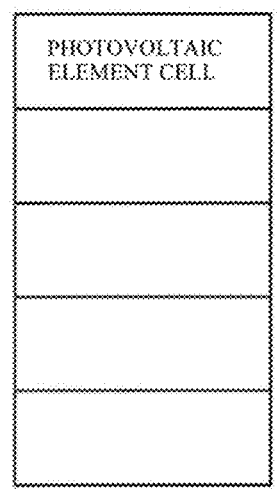
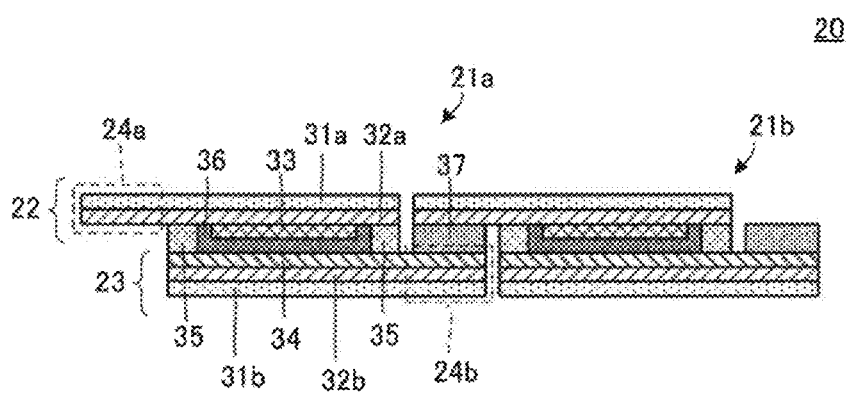
FIG. 7

CHARGING CIRCUIT AND MODULE USING THE SAME

CROSS REFERENCE TO RELATED APPLICATIONS

The present application is a continuation of International application No. PCT/JP2015/054936, filed Feb. 23, 2015, which claims priority to Japanese Patent Application No. 2014-052290, filed Mar. 14, 2014, the entire contents of each of which are incorporated herein by reference.

TECHNICAL FIELD

The present invention relates to charging circuit including an electric storage element and a power generation element, and to a module using the circuit.

BACKGROUND ART

Conventional charging circuits include, for example, the charging device mentioned in Patent Document 1. In this charging device, a power generation element is connected to an electric storage element via a DC/DC converter. The power generation element is a photoelectric conversion element that converts irradiation light energy to electric power. The DC/DC converter supplies, to an electric storage element, the electric power generated in the photoelectric conversion element. The electric storage element stores the electric power supplied. As just described, the electric storage element can be charged by irradiating the photoelectric conversion element with light.

PRIOR ART DOCUMENT

Patent Document

Patent Document 1: Japanese Patent Application Laid-Open No. 10-304585

In the charging device in Patent Document 1, a power loss is caused in converting the voltage on the photoelectric conversion element side to the voltage on the electric storage element side through the DC/DC converter. For this reason, the electric power generated by the photoelectric conversion element is not able to be efficiently stored in the electric storage element. In addition, the charging device includes the DC/DC converter, thus increasing the number of parts, and increasing the size of the charging device. In addition, without details regarding the electric storage element, for example, the use of a capacitor as the electric storage element results in failure to supply the voltage required for operating the driven unit in a stable manner, because of linear charge and discharge curves.

An object of the present invention is to provide a charging circuit which can efficiently store electric power generated, and a module using the circuit.

Means for Solving the Problem

A charging circuit according to the present invention includes an electric storage element and a power generation element that charges the electric storage element. The power-generating voltage of the power generation element has a rated power generation voltage equal to or more than the rated charging voltage of the electric storage element. The electric storage element is preferably a secondary battery that includes a lithium-transition metal oxide in a positive electrode active material layer, and includes a lithium-titanium oxide of spinel-type crystal structure in a negative electrode active material layer.

With this configuration, there is no need to use a boosting circuit to boost the power-generating voltage of the power generation element in order to charge the electric storage element. For this reason, power loss is reduced, and the electric storage element can be efficiently charged. In addition, because there is no need to use a boosting circuit the number of parts can be reduced and the charging circuit can be reduced in size.

In addition, the use of the electric storage element including the lithium-transition metal oxide in the positive electrode active material layer and the lithium-titanium oxide of spinel-type crystal structure in the negative electrode active material layer can improve the reliability of charging the electric storage element, without causing the deposition (dendrite) of lithium metal at the negative electrode, because the negative electrode active material layer has a high charging potential of 1.55 V on the basis of Li/Li+. In addition, the decomposition of an electrolytic solution can be suppressed, and a stable electric storage element can be further achieved which has excellent cycle characteristics. The related charging voltage of such an electric storage element is lower than the charging voltage (3.8 V) of a common secondary battery, and the rated power-generating voltage required for the power generation element can be reduced. In addition, the use of the secondary battery for the electric storage element results in a stabilized charging voltage, as compared with a capacitor that has a linear charge-discharge curve, thereby making it possible to supply electric power to a driven unit at a stabilized voltage.

In the charging circuit according to a preferred embodiment of the present invention, the rated power-generating voltage of the power generation element is preferably 100 to 130% of the rated charging voltage of the electric storage element.

With this configuration, power loss is reduced between the power generation element and the electric storage element and charging efficiency can be improved. In addition, it is possible to avoid damage to the electric storage element as a result of an overvoltage applied thereto.

In the charging circuit according to a preferred embodiment of the present invention, the power generation element is preferably a dye-sensitized photoelectric conversion element, an amorphous Si photoelectric conversion element, a compound-semiconductor thin-film photoelectric conversion element, or an organic thin-film photoelectric conversion element.

The power generation element preferably includes a photoelectric conversion element. Because the rated charging voltage of the electric storage element is lower than the rated charging voltage (3.8 V) of a common secondary battery, the number of photoelectric conversion element cells in series, constituting the photoelectric conversion element, can be reduced and the power generation element can be thus reduced in size.

In addition, when the number of photoelectric conversion element cells in series is reduced, the area of the individual photoelectric conversion element cells can be increased without changing the area of the photoelectric conversion element. Further, the amount of current in the power generation of the photoelectric conversion element is proportional to the areas of the photoelectric conversion element cells. For this reason, the charging rate can be improved without changing the area of the power generation element.

In addition, in a dye-sensitized photoelectric conversion element, an amorphous Si photoelectric conversion element, a compound-semiconductor thin-film photoelectric conversion element, or an organic thin-film photoelectric conversion element, the rate of change in power-generating voltage with respect to illuminance is reduced, thereby providing stabilized power-generating voltages in a wide range of environments. For this reason, sufficient power-generating voltages can be obtained even under low-illuminance environments. In addition, even under high-illuminance environments, excessively high power-generating voltages are less likely to be generated, and the electric storage element can be thus prevented from being broken.

In the charging circuit according to the present invention, the power generation element is preferably a photoelectric conversion element, and in an environment in an illuminance range of 50 to 2000 lux, the rated power-generating voltage of the photoelectric conversion element is preferably kept at at least 60% of the rated power-generating voltage of the photoelectric conversion element at 2000 lux.

With this configuration, stabilized power-generating voltages can be obtained in a wide range of environments. For this reason, sufficient power-generating voltages can be obtained even under low-illuminance environments. In addition, even under high-illuminance environments, excessively high power-generating voltages are less likely to be generated, and the electric storage element can be thus prevented from being broken.

In the charging circuit according to a preferred embodiment of the present invention, a protection circuit may be inserted between the power generation element and the electric storage element. With this configuration, the electric storage element can be prevented from being broken with overvoltage applied to the electric storage element.

In the charging circuit according to a preferred embodiment of the invention, the thickness of both positive electrode active material layer and the negative electrode active material layer are preferably no more than 100 μm each. With this configuration, the distance between the active material layer and the current collector is reduced, thereby making it possible to lower the resistance associated with the charge-discharge reaction. Thus, the electric storage element allows a large current to flow. For this reason, the need to provide a capacitor or the like for causing a large current to flow instantaneously is eliminated, thus making it possible to reduce the number of parts, and reduce the power loss associated with charge transfer.

A module according to an embodiment of the present invention includes the charging circuit according to the present invention and a driven unit (more generally a circuit) driven by (powered by) the electric storage element of the charging circuit. The rated operating voltage of the driven unit is equal to or less than the rated charging voltage of the electric storage element. With this configuration, it becomes possible to operate the driven unit without using a boosting circuit. For this reason, the power loss is reduced and a module with a high degree of power efficiency can be obtained.

In the module according to an embodiment of the present invention, the driven unit may have a sensor that measures at least one of infrared, magnetism, temperature, humidity, atmospheric pressure, flow rate, illuminance, light, sound waves, odors, and tactile. With this configuration, the use of information obtained through the sensor makes it possible to achieve monitoring of environments, security, and the like. In the module according to an embodiment of the present invention, the driven unit may have a radio communication unit, a storage unit, a control unit that controls the radio communication unit and the storage unit. With this configuration, causing the module to communicate with a computer or the like via radio waves can cause the module to function as a node of a network system.

In the module according to an embodiment of the present invention, the storage unit stores a personal identification number for identifying the module from other modules. With this configuration, each module can be distinguished in a sensor network system composed of multiple modules.

In the module according to an embodiment of the present invention, the driven unit may have a display unit and a control unit that controls the display unit With this configuration, the result of the measurement with the sensor, and the like can be confirmed on the display unit.

BRIEF EXPLANATION OF DRAWINGS

FIG. 6(A) is a pattern diagram of a photoelectric conversion element as a first comparative example. FIG. 6(B) is a block diagram of a photoelectric conversion element according to a first example. FIG. 6(C) is a block diagram of a photoelectric conversion element according to a second example.

FIG. 7 is a cross-sectional view of a dye-sensitized solar cell 20 according to the present embodiment.

DESCRIPTION OF THE PREFERRED EMBODIMENTS

Figure 1:
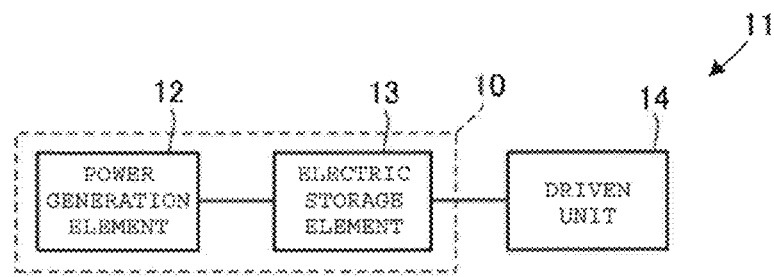
FIG. 1 is a block diagram of a charging circuit and a module according to the present embodiment.

A charging circuit 10 according to a first embodiment of the present invention will be described. FIG. 1 is a block diagram of a module 11 which includes the charging circuit 10 and a driven unit 14 (e.g., a sensor). The charging circuit 10 includes a power generation element 12 and an electric storage element 13. The electric storage element 13 is preferably a secondary battery including a lithium-transition metal oxide in a positive electrode active material layer, and a lithium-titanium oxide of spinel-type crystal structure in a negative electrode active material layer. The power generation element 12 is connected to the electric storage element 13 to charge the electric storage element 13. The electric storage element 13 is connected to the driven unit 14 to drive the driven unit 14 using the stored electric power. Further, a protection circuit such as a switch IC may be inserted between the power generation element 12 and the electric storage element 13.

In the case of using an environment-friendly power generation element as the power generation element 12 as will be described later, the electric power obtained from the environment-friendly power ranges widely from several nW to several W, and depending on the usage environment, the electric power that can be supplied steadily is often low. On the other hand, the driven unit 14 driven by the electric power stored in the electric storage element 13 operates for a short period of time, but requires a relatively large current such as several tens mA for its operation. For this reason, in order to operate the driven unit 14, there is a need to store electric power in the electric power element 13 over time, and then use the stored electric power to operate the driven unit. In addition, the environment where the environment-friendly power generation element is located is often not stable and stable electric power is not always supplied to the driven unit 14. By storing electric power in the electric storage element 13 over time, the electric storage element 13 can supply sufficient electric power for the operation of the driven unit 14, even in a situation where electric power is not obtained from the power generation element 12.

The rated power-generating voltage of the power generation element 12 has a value equal to or greater than the rated charging voltage of the electric storage element 13. The rated charging voltage of the electric storage element 13 is desirably 2.0 to 3.0 V, and more desirably 2.2 to 2.5 V. As used herein, the rated power-generating voltage of the power generation element refers to an open voltage between positive and negative terminals of the power generation element which is generated when the power generation element is located in an environment where an energy source is present. The rated charging voltage of the electric storage element refers to a difference between the potential of releasing lithium ions at the positive electrode and the potential of storing lithium ions at the negative electrode.

The rated operating voltage for the driven unit 14 is often 1.8 to 2.2 V, and when the rated charging voltage is 2.0 V, a boosting circuit is required to operate the driven unit 14.

On the other hand, when the rated charging voltage reaches 3.0 V, the rated power-generating voltage of the power generation element 12 needs to be 3.0 V or more, and thus, in the case of using a photovoltaic element as the power generation element, the charging efficiency is decreased (see the description below with reference to FIG. 6). Therefore, the rated charging voltage of the electric storage element 13 is more desirably approximately 2.2 to 2.5 V.

In particular, the rated power-generating voltage of the power generation element 12 is preferably within the range of 100 to 130%, and more preferably, within the range of 100 to 120%, of the rated charging voltage of the electric storage element 13. For example, when the rated charging voltage of the electric storage element 13 is 2.3 V, the rated power-generating voltage of the power generation element 12 is preferably within the range of 2.3 to 3.0 V, and more preferably within the range of 2.3 to 2.8 V.

The rated operating (driving) voltage for the driven unit 14 is less than or equal to the rated charging voltage of the electric storage element 13. The driving voltage for the driven unit 14 and the charging voltage of the electric storage element 13 have desirably close values to each other. The driven unit 14 may be composed of a single element or may be a circuit composed of multiple elements.

An environment-friendly power generation element is preferably used as the power generation element 12 which extracts energy from an external environment. Thus, as long as there is energy under the external environment, it is possible to continually supply electric power from the power generation element 12 to the electric storage element 13. Direct-current power generation elements which can be used include a photoelectric conversion element using a photoelectric conversion effect, a thermoelectric conversion element using a Seebeck effect, and an electromagnetic wave power generation element using rectenna. Alternating-current power generation elements which can be used include a vibration-type power generation element that converts vibration energy to electric power through the use of electromagnetic induction, a piezoelectric effect, electret, or the like.

A photoelectric conversion element having a high rated power-generating voltage is preferably used as the power generation element 12. It is even more desirable to use a dye-sensitized solar cell, an amorphous Si solar cell, a compound-semiconductor thin-film solar cell, an organic thin-film solar cell, or the like with a stabilized power-generating voltage under a wide range of usage environments. It is even more desirable to use a dye-sensitized solar cell which is excellent in voltage stability from low-illuminance environments to high-illuminance environments. Details of preferred dye-sensitized solar cells will be described later. In an environment in an illuminance range of 50 to 2000 lux, the power-generating voltage of the photoelectric conversion element is desirably kept 60% or more with respect to the power-generating voltage of the photoelectric conversion element at 2000 lux The dye-sensitized photoelectric conversion element is preferably a dye-sensitized solar cell. The amorphous Si photoelectric conversion element is preferably an amorphous Si solar cell. The compound-semiconductor thin-film photoelectric conversion element is preferably a compound-semiconductor thin-film solar cell. The organic thin-film photoelectric conversion element is preferably an organic thin-film solar cell.

The electric storage element 13 is preferably a lithium ion secondary battery as described above. The electric storage element 13 preferably has a positive electrode obtained by forming the positive electrode active material layer on a positive electrode current collector, whereas the electric storage element 13 preferably has a negative electrode obtained by forming the negative electrode active material layer on a negative electrode current collector. The thickness of the positive electrode active material layer and the negative electrode active material layer are preferably no more than 100 μm, more preferably no more than 50 μm, and even more preferably no more than 30 μm.

As described above, the negative electrode active material layer of the electric storage element 13 preferably includes a lithium-titanium oxide of spinel-type crystal structure, whereas the positive electrode active material layer of the electric storage element 13 preferably includes a lithium-transition metal oxide. The positive electrode active material is not particularly limited as long as the material is a lithium-transition metal oxide, but materials that are used commonly in lithium ion secondary batteries can be used as the positive electrode active material. For example, a lithium cobalt oxide, a lithium manganese oxide, a lithium nickel oxide, a lithium-nickel-manganese-cobalt oxide, a lithium-manganese-nickel oxide, a lithium-manganese-cobalt oxide, a lithium-nickel-cobalt oxide, and a lithium iron phosphate can be used as the positive electrode active material. Furthermore, the materials mentioned above may be mixed for the positive electrode active material. The electric storage element 13 can be prepared by the use of the foregoing materials. Details of a preferred electric storage element 13 will be described later.

The negative electrode active material layer of the electric storage element 13 may be a material combination layer including a lithium-titanium oxide of spinel-type crystal structure, whereas the positive electrode active material layer of the electric storage element 13 may be a material combination layer including a lithium iron phosphate (LiFePO4). The layers can adjust the charging voltage of the electric storage element 13 to 2.0 V.

In addition, the negative electrode active material layer of the electric storage element 13 may be a material combination layer including a lithium-titanium oxide of spinel-type crystal structure, whereas the positive electrode active material layer of the electric storage element 13 may be a material combination layer including a lithium-manganese-nickel oxide (Li(Ni0.5Mn1.5)O4). The layers can adjust the charging voltage of the electric storage element 13 to 3.0 V.

In addition, the negative electrode active material layer of the electric storage element 13 may be a material combination layer including a lithium-titanium oxide of spinel-type crystal structure, whereas the positive electrode active material layer of the electric storage element 13 may be a material combination layer including a lithium cobalt oxide (LiCoO2). The layers can adjust the charging voltage of the electric storage element 13 to 2.3 V. These configurations can prepare the electric power element 13 with a charging voltage of 2.0 V to 3.0 V.

Figure 2:
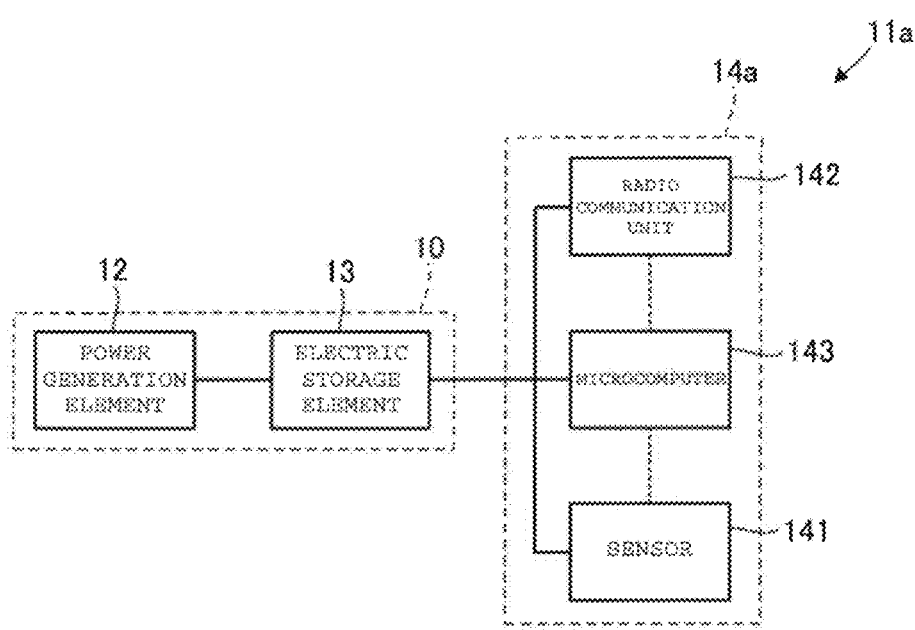
FIG. 2 is a block diagram illustrating a specific example of a driven unit according to the present embodiment.

FIG. 2 is a block diagram illustrating a specific example of the driven unit 14. In this embodiment a module 11a has a sensing and a communicating function, and functions as one of sensor nodes in a sensor network system. The driven unit 14a includes a sensor 141, a radio communication unit 142, and a microcomputer 143. The sensor 141, the communication unit 142, and the microcomputer 143 are powered by and connected to the electric storage element 13 over power lines (solid lines). The operating voltage for the driven unit 14a is typically between 1.8 and 2.2 V. The microcomputer 143 is connected to the sensor 141 and the radio communication unit 142 over control lines (dotted lines).

The sensor 141 measures, for example, infrared, magnetism, temperature, humidity, atmospheric pressure, flow rate, illuminance, light, sound waves, odors, and tactile. The radio communication unit 142 transmits the result measured by the sensor 141 to a computer or the like via radio waves. The microcomputer 143 has a storage unit (not shown) that stores a parameter required for the module 11a, and a control unit (not shown) that controls the sensor 141, the radio communication unit 142, the storage unit, and the like. The control unit of the microcomputer 143 can desirably control the operation of the module 11a depending on power obtained from the power generation element 12, in order to operate the module 11a in a stable manner. For example, the control unit of the microcomputer 143 can desirably control the module 11a in an intermittent manner, depending on power obtained from the power generation element 12. The storage unit of the microcomputer 143 stores individual identification numbers for distinguishing each sensor node in the sensor network system. Further, the driven unit 14a may include a display unit controlled by the control unit of the microcomputer 143.

In the module 11a, the radio transmission of information obtained by the sensor 141 to a computer or the like makes it possible to achieve monitoring of environments, security, and the like. In addition there is no need to wire any power line externally, thus, it is possible to dispose the module 11a later without any external power-supply construction. In addition, an environment-friendly power generation element is used in the module 11a and there is no need for any battery replacement or fuel supply operation, unlike primary batteries (i.e., power sources that require fuels, and the like).

Figure 3:
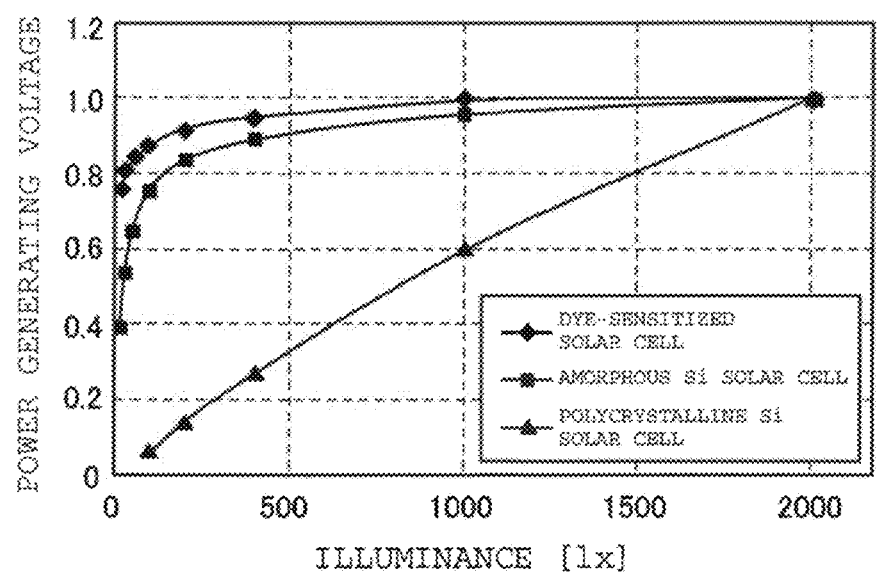
FIG. 3 is a graph showing illuminance dependences of power-generating voltages of photoelectric conversion elements.

FIG. 3 is a graph showing illuminance dependences of power-generating voltages of photoelectric conversion elements as well as measurement results for a dye-sensitized solar cell prepared by a later described method, a common amorphous Si solar cell, and a common polycrystalline Si solar cell. In FIG. 3, the power-generating voltages of the respective photoelectric conversion elements are normalized with the power-generating voltages of the respective photoelectric conversion elements at an illuminance of 2000 lux.

The polycrystalline Si solar cell has a power-generating voltage below 60% at an illuminance of approximately 1000 lux. In contrast, the amorphous Si solar cell keeps the power-generating voltage 60% even at an illuminance of 30 lux, and the dye-sensitized solar cell keeps the power-generating voltage 60% even at an illuminance of 10 lux. More specifically, in the environment in the illuminance range of 50 to 2000 lux, the power-generating voltages of the amorphous Si solar cell and dye-sensitized solar cell are kept 60% or more with respect to the power-generating voltages thereof at an illuminance of 2000 lux. In addition, the polycrystalline Si solar cell has a power-generating voltage below 80% at an illuminance of approximately 1500 lux. In contrast, the amorphous Si solar cell keeps the power-generating voltage 80% even at an illuminance of 150 lux, and the dye-sensitized solar cell keeps the power-generating voltage 80% even at an illuminance of 30 lux. As just described, the amorphous Si solar cell and the dye-sensitized solar cell achieve stabilized power-generating voltages over a wide range of environments.

Figure 4:
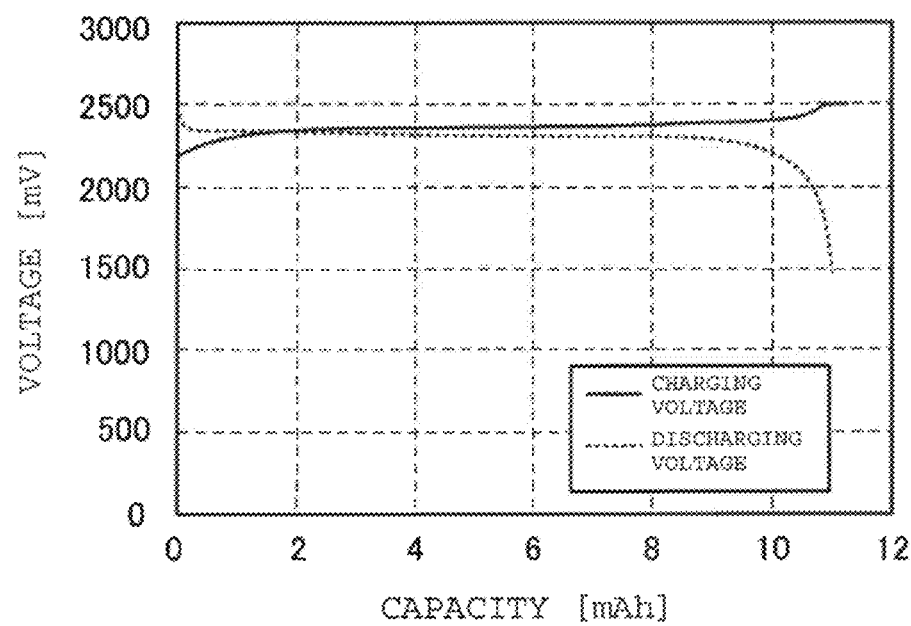
FIG. 4 is a graph showing charge and discharge curves for a lithium ion secondary battery according to the present embodiment.

FIG. 4 is a graph showing charge and discharge curves for a lithium ion secondary battery prepared by a later described method. This lithium ion secondary battery has flat charging voltage curve and discharging voltage curve that change in the range of approximately 2.3 to 2.5 V. The use of this lithium ion secondary battery as the electric power element 13 in the charging voltage range of approximately 2.3 to 2.5 V reduces voltage losses during charge and discharge due to changes in charging voltage and discharging voltage. For this reason, efficient charging can be achieved from the power generation element 12 to the electric storage element 13, and efficient discharging can be achieved from the electric storage element 13 to the driven unit 14.

Figure 5:
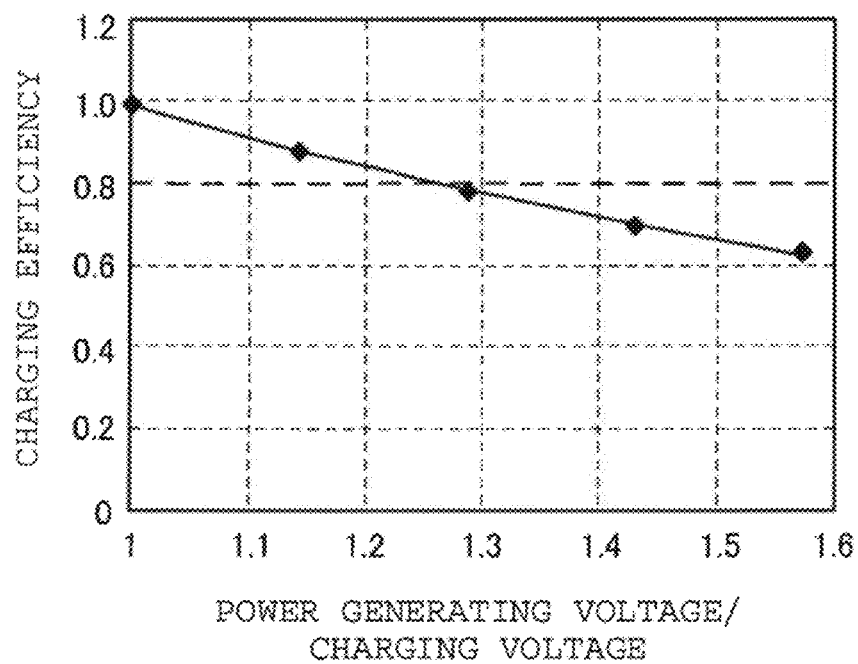
FIG. 5 is a graph showing a charging efficiency with respect to the voltage ratio between a power-generating voltage and a charging voltage.

FIG. 5 is a graph showing the charging efficiency with respect to the voltage ratio between the power-generating voltage and the charging voltage. In this regard, the voltage ratio is expressed as the power-generating voltage of power generating element divided by the charging voltage of electric storage element. The charging efficiency is an indicator of the efficiency of charging the electric storage element with electric power generated by the power generation element, and is equal to the electric power stored in the electric storage element divided by the electric power generated by the power generation element. For FIG. 5, a dye-sensitized solar cell prepared by a later described method was used as the power generation element, whereas a lithium ion secondary battery prepared by a later described method was used as the electric storage element. The power-generating voltage of the power generation element and the voltage ratio were changed by changing the number of dye-sensitized solar cells in series and the conditions for preparation thereof, and the charging efficiency was measured in that case.

As the voltage ratio was increased, the charging efficiency gradually decreased. This is the result of the power loss resulting from electric power due to the difference between the rated power-generating voltage and the rated charging voltage. When the voltage ratio was 1.3, the charging efficiency was approximately 80%. For this reason, keeping the rated power-generating voltage in the range of 100 to 130% of the rated charging voltage can charge the electric storage element 13 with the electric power generated by the power generation element 12 at a high charging efficiency of 80% or more, without providing any extra element.

FIG. 6(A) is a pattern diagram of a photoelectric conversion element 12a as a first comparative example. FIG. 6(B) is a pattern diagram of a photoelectric conversion element 12b as a first example. FIG. 6(C) is a pattern diagram of a photoelectric conversion element 12c as a second example. The photoelectric conversion elements 12b, 12c are examples of the power generation element 12 (see FIG. 1). The photoelectric conversion elements 12a to 12c are composed of multiple photoelectric conversion element cells connected in series. Each photoelectric conversion element cell has a power-generating voltage of 0.5 V. The electric storage element (not shown) according to the first comparative example has a charging voltage of 3.8 V. The electric storage elements according to the first example and the second example have a charging voltage of 2.3 V. The area of the photoelectric conversion element cells according to the first example is equal to the area of the photoelectric conversion element cells according to the first comparative example. The area of the photoelectric conversion element 12c is equal to the area of the photoelectric conversion element 12a.

When the number of photoelectric conversion element cells in series is N, the power-generating voltage VT of the photoelectric conversion element is expressed by VT=NVC where the power-generating voltage of the photoelectric conversion element cell is denoted by VC, and the amount of current IT in the power generation of the photoelectric conversion element is equal to the amount of current IC in the power generation of the photoelectric conversion element cell. In addition, the amount of current IC in the power generation of the photoelectric conversion element cell is proportional to the area SC of the photoelectric conversion element cell. The area ST of the photoelectric conversion element is expressed by ST=NSC. From these relationships, the amount of current IT in the power generation of the photoelectric conversion element is expressed by IT=IC∝SC=ST/N. In addition, when it is assumed that there is a sufficiently small power loss between the photoelectric conversion element and the electric storage element, the charging rate is nearly equal to the amount of current IT in the power generation of the photoelectric conversion element. The charging rate refers to the charge amount stored in the electric storage element per unit time, that is, the amount of current flowing into the electric storage element.

For the photoelectric conversion element 12a, eight photoelectric conversion element cells are connected in series in order to increase the power-generating voltage compared to the charging voltage of the electric storage element. On the other hand, for the photoelectric conversion elements 12b, 12c, five photoelectric conversion element cells are connected in series in order to increase the power-generating voltage compared to the charging voltage of the electric storage element 13.

As described above, the area of the individual photoelectric conversion element cell according to the first example is equal to the area of the individual photoelectric conversion element cell according to the first comparative example. For this reason, the area of the photoelectric conversion element 12b is 5/8 times as large as the area of the photoelectric conversion element 12a. It is to be noted that the charging rate in the first example is not different from the charging rate in the first comparative example.

As described above, the area of the individual photoelectric conversion element 12c is equal to the area of the individual photoelectric conversion element 12a. For this reason, the area of the photoelectric conversion element cell according to the second example is 8/5 times as large as the area of the photoelectric conversion element cell according to the first comparative example, and the amount of current in the power generation of the photoelectric conversion element 12c is 8/5 times as large as the amount of current in the power generation of the photoelectric conversion element 12a. The power-generating voltages of the photoelectric conversion elements 12a, 12c are close in value to the charging voltage of the electric storage element, and the power loss is thus sufficiently reduced between the photoelectric conversion elements 12a, 12c and the electric storage element. For this reason, the charging rate in the second example is improved to approximately 8/5 of the charging rate in the first comparative example.

As just described, when the power generation element 12 is composed of multiple photoelectric conversion element cells connected in series, lowering the charging voltage of the electric storage element 13 can reduce the size of the power generation element 12, and improve the charging rate.

In the present embodiment, the power-generating voltage of the power generation element 12 has a value equal to or greater than the charging voltage of the electric storage element 13 as described with reference to FIG. 1. For this reason, it is not necessary to boost the power-generating voltage of the power generation element 12 with a boosting circuit in order to charge the electric storage element 13. As a result, power loss is reduced and the electric storage element 13 can be efficiently charged. In addition, because there is no need to use a boosting circuit, the number of parts can be reduced and the charging circuit 10 can be reduced in size.

In addition, as described above, the electric storage element 13 is preferably a secondary battery including a lithium-transition metal oxide in a positive electrode active material layer, and a lithium-titanium oxide of spinel-type crystal structure in a negative electrode active material layer. The reliability of charging the electric storage element 13 can be improved, without causing the deposition (dendrite) of lithium metal at the negative electrode, because the negative electrode active material layer has a high charging potential of 1.55 V on the basis of Li/Li+. In addition, the decomposition of an electrolytic solution can be suppressed, and the stable electric storage element 13 can be further achieved which has excellent cycle characteristics. The charging voltage of this electric storage element 13 is lower as compared with the charging voltage (3.8 V) of a common secondary battery, and the power-generating voltage required for the power generation element 12 can therefore be reduced. In addition, the use of the secondary battery for the electric storage element 13 results in a stabilized charging voltage, as compared with a capacitor that has a linear charge-discharge curve, thereby making it possible to supply electric power to the driven unit 14 at a stabilized voltage.

In addition, when the rated power-generating voltage of the power generation element 12 is within the range of 100 to 130% of the rated charging voltage of the electric storage element 13, the power loss is reduced between the power generation element 12 and the electric storage element 13, and the charging efficiency is improved. In addition, the electric storage element 13 can be prevented from being damaged as a result of an overvoltage applied to the electric storage element 13.

In addition, as described above, the rated charging voltage of the electric storage element 13 is lower than the rated charging voltage (3.8 V) of a common secondary battery. For this reason, in the case of using a photoelectric conversion element as the power generation element 12, the number of photoelectric conversion element cells in series, constituting the photoelectric conversion element, can be reduced, and the power generation element 12 can be thus reduced in size.

In addition, when the number of photoelectric conversion element cells in series is reduced, the areas of the individual photoelectric conversion element cells can be increased without changing the total area of the photoelectric conversion element. Further, the amount of current in the power generation of the photoelectric conversion element is proportional to the areas of the photoelectric conversion element cells. For this reason, the charging rate can be improved without changing the area of the power generation element 12.

In addition, the use of an amorphous Si solar cell or a dye-sensitized solar cell as the power generation element 12 reduces the rate of change in power-generating voltage with respect to illuminance, thereby providing stabilized power-generating voltages in a wide range of environments. For this reason, sufficient power-generating voltages can be obtained even under low-illuminance environments. In addition, even under high-illuminance environments, excessively high power-generating voltages are less likely to be generated, and the electric storage element 13 can be thus prevented from being broken.

In addition, there is a need to cause a large current to flow instantaneously for driving the driven unit 14. In order to solve this problem, a capacitor or the like is typically inserted in parallel to the electric storage element 13. The thickness of the positive electrode active material layer and negative electrode active material layer of the electric storage element 13 are no more than 100 μm, more preferably no more than 50 μm, and even more preferably no more than 30 μm, thereby reducing the distance between the active material layer and the current collector and making it possible to lower the resistance associated with the charge-discharge reaction. Thus, the electric storage element 13 allows a large current to flow. For this reason, the need to provide a capacitor or the like is eliminated, thus making it possible to reduce the number of parts, and reduce the power loss associated with charge transfer.

In addition, the operating voltage for the driven unit 14 is preferably no greater than the charging voltage of the electric storage element 13. For this reason, it becomes possible to operate the driven unit 14 without using a boosting circuit. In addition, the driving voltage of the driven unit 14 is made close to the charging voltage of the electric storage element 13, thereby eliminating the need to provide a voltage-dropping circuit, and reducing voltage losses.

In addition, five photoelectric conversion element cells each with a power-generating voltage of 0.5 V can be connected in series to constitute the power generation element 12 with a power-generating voltage of 2.5 V. The charging voltage of the electric storage element 13 can be adjusted to 2.3 V through the use of a lithium-titanium oxides of spinel-type crystal structure as the negative electrode active material layer of the electric storage element 13, and the use of a lithium-transition metal oxide of layered crystal structure, for example, a lithium cobalt oxide (LiCoO2) as the positive electrode active material layer of the electric storage element 13. In addition, the driving voltage for the driven unit 14 is typically often 1.8 to 2.2 V.

This configuration causes the rated power-generating voltage of the power generation element 12, the rated charging voltage of the electric storage element 13, and the rated driving voltage for the driven unit 14 to be close in value. For this reason, the power loss between the power generation element 12 and the electric storage element 13 can be reduced as can the power loss between the electric storage element 13 and the driven unit 14. As a result, this configuration can provide a module with a high degree of power efficiency Further, in the charging circuit according to the present invention, an IC switch may be inserted between the power generation element 12 and the electric storage element 13. The IC switch turns off charging the electric storage element 13, when an excessive voltage is applied to the electric storage element 13. Thus, for example, in the case of using a photoelectric conversion element as the electric storage element 13, the electric storage element 13 can be prevented from being broken even when the photoelectric conversion element generates an unexpected power-generating voltage due to the fact that the photoelectric conversion element is exposed to an excessively bright environment.

In addition, in the charging circuit according to the present invention, a diode may be inserted between the power generation element 12 and the electric storage element 13. This diode preferably has a breakdown voltage equal to or more than the charging voltage of the electric storage element 13. Thus, when the charging voltage of the electric storage element 13 exceeds the power-generating voltage of the power generation element 12, electric current can be prevented from flowing backward from the electric storage element 13 to the power generation element 12. In addition, in place of the diode, an IC switch may be inserted which opens between the power generation element 12 and the electric storage element 13 when the charging voltage of the electric storage element 13 exceeds the power-generating voltage of the power generation element 12.

In addition, in the module according to the present invention, an IC switch may be inserted between the electric storage element 13 and the driven unit 14. The IC switch turns off power supply to the driven unit 14, when the charging voltage of the electric storage element 13 falls below a predetermined voltage. Thus, the driven unit 14 can be prevented from malfunctioning when the charging voltage of the electric storage element 13 falls below the driving voltage for the driven unit 14.

In addition, in the module according to the present invention, a regulator such as a boosting circuit may be inserted between the electric storage element 13 and the driven unit 14. In addition, a capacitor may be inserted in parallel to the electric storage element 13 in order to cause a large current to flow instantaneously.

FIG. 7 is a cross-sectional view of a dye-sensitized solar cell 20. The dye-sensitized solar cell 20 includes a pair of solar cells 21a, 21b. The solar cells 21a and 21b are preferably configured in the same manner as each other, and connected in series with respective extraction electrode parts 24a, 24b connected with a conductive adhesive 37. The solar cell 21a includes a working electrode substrate 22, a counter electrode substrate 23, a sealing material 35, and an electrolytic solution 36. It is to be noted that the number of solar cells connected in series is not limited to 2. Any number of dye-sensitized solar cells connected in series can be used to achieve a desired power-generating voltage.

The working electrode substrate 22 is opposed to the counter electrode substrate 23 with the sealing material 35 interposed therebetween. The working electrode substrate 22 and the counter electrode substrate 23 abut the sealing material 35. The working electrode substrate 22, the counter electrode substrate 23, and the sealing material 35 form a hollow space which is filled with the electrolytic solution 36. The working electrode substrate 22 has the extraction electrode part 24a extended to have no overlap with the counter electrode substrate 23 in a planar view. The counter electrode substrate 23 has the extraction electrode part 24b extended to have no overlap with the working electrode substrate 22 in a planar view. The conductive adhesive 37 is provided between the extraction electrode part 24b of the counter electrode substrate 23 in the solar cell 21a and the extraction electrode part 24a of the working electrode substrate 22 in the solar cell 21b.

The working electrode substrate 22 has a base material 31a, a conductive film 32a, and a photoelectric conversion layer 33 stacked in this order. The conductive film 32a is formed over the entire principal surface of the base material 31a. The photoelectric conversion layer 33 is formed on a part of the principal surface of the conductive film 32a. The counter electrode substrate 23 has a base material 31b, a conductive film 32b, and a catalyst layer 34 stacked in this order. The conductive film 32b is formed over the entire principal surface of the base material 31b. The catalyst layer 34 is formed over the entire principal surface of the conductive film 32b.

A principal surface of the working electrode substrate 22 closer to the photoelectric conversion layer 33 is opposed to a principal surface of the counter electrode substrate 23 closer to the catalyst layer 34. The photoelectric conversion layer 33 and a part of the catalyst layer 34 partially constitute the inner wall of the above-described hollow in contact with the electrolytic solution 36. The conductive adhesive 37 is connected to the catalyst layer 34 of the solar cell 21a and the conductive film 32a of the solar cell 21b.

The base materials 31a, 31b have insulation properties and transparency, which are composed of, for example, a resin substrate such as PET, PEN, or polycarbonate, glass, or the like. The conductive films 32a, 32b have conductive properties and transparency, which are composed of, for example, a transparent oxide conductive film such as an ITO, an FTO, or a ZnO, a metallic transparent conductive film such as a nano-Ag wire, a conductive polymer such as PEDOT, a carbon-based transparent conductive film such as CNT.

The photoelectric conversion layer 33 is formed by adsorbing a sensitizing dye onto a porous film of particulate zinc oxide agglomerated. As for the particle size of the zinc oxide, particles of 5 to 100 nm in size desirably make up a main constituent, more desirably, particles on the order of 10 to 30 nm in size make up a main constituent, because there is a need to increase the specific surface area of the porous film, and additionally improve the necking between respective particles. In addition, there is not always a need for the porous film to be composed of only particles of 5 to 100 nm in size, but the porous film even has a mixture with particles of 100 nm or more in size without any problem. It is to be noted that the material for the porous film is not limited to zinc oxide, but titanium oxide, tin oxide, and the like may be used.

The sensitizing dye desirably has at least one adsorption group such as a carboxyl group or a sulfonic acid group, which can be adsorbed onto zinc oxide. In addition, the sensitizing dye desirably has a LUMO level lower than the conduction band level of the zinc oxide, and a HOMO level higher than the redox level of the electrolyte in the electrolytic solution 36. While organic dyes such as coumarin, indoline, and squarylium, metal complex dyes such as Ru, and natural dyes can be used as the sensitizing dye, it is desirable to use an organic dye in the case of using a zinc oxide porous film. Specifically, examples of the sensitizing dye can include EosinY, D149, D102, and D131.

The catalyst layer 34 may be any material that reduces the electrolyte in the electrolytic solution 36, and for example, composed of Pt, a conductive polymer such as PEDOT (3,4-ethylene dioxythiophene) or polyaniline, or a carbon-based material such as CNT (Carbon nanotube), activated carbon, graphene, or carbon black. The sealing material 35 is composed of, for example, an ultraviolet curable resin, a thermosetting resin, a thermoplastic resin, a two-part curable resin, or the like. The sealing material 35 is desirably incompatible with the electrolyte in the electrolytic solution 36 even in an uncured state or a cured state.

As a solvent of the electrolytic solution 36, organic solvents, ionic liquids, and the like can be used, but it is preferable to use a material with a boiling point of 85° C. or higher. For example, propylene carbonate and the like can be used as the solvent of the electrolytic solution 36. As an electrolyte of the electrolytic solution 36, iodine compound-iodine, bromine compound-bromine, cobalt complexes can be used, but it is preferable to use iodine compound-iodine in terms of property and stability. The oxidant in the electrolyte desirably has a concentration on the order of 0.0001 to 1 M, whereas the reductant in the electrolyte desirably has a concentration on the order of 0.001 to 1 M. Under low-illuminance environments, the oxidant desirably has a concentration on the order of 0.0001 to 0.1 M, whereas the reductant desirably has a concentration on the order of 0.001 to 1 M.

Next, a method for preparing the preferred dye-sensitized solar cell 20 will be described.

<Preparation of Working Electrode Substrate 22>

A zinc oxide powder having an average particle size of 25 nm is heated, and the obtained zinc oxide powder is put in ethanol, and stirred while cooling with the use of a magnetic stirrer, thereby providing a zinc oxide paste. It is to be noted that the solution in which the zinc oxide powder is placed is not limited to ethanol. Methanol, propanol, butanol, or the like can also be used.

In addition, it is more desirable to add, to the zinc oxide paste, a dispersant that acts as a dispersant. The addition of the dispersant suppresses the agglomeration of zinc oxide microparticles in the zinc oxide paste, and a porous zinc oxide film can be thus obtained which is excellent in film quality. The dispersant desirably has a functional group coordinate on zinc oxide, and desirably has an amino group, a carboxyl group, a phosphate group, a phosphite group, a ketone group, a hydroxyl group, or a phosphonate group. In addition, as for properties of the dispersant, it is preferable that the dispersant can be easily removed in an atmosphere at 150° C. or lower or can be easily removed with a polar solvent.

Next, a PET (Polyethylene Terephthalate) film with an ITO (Indium Tin Oxide) film is prepared, and a masking tape is attached to a space of the principal surface of the ITO film other than the space thereof on which the zinc oxide paste is to be applied. Next, the zinc oxide paste is delivered by drops onto the ITO film, and then spread onto the ITO film so that the zinc oxide paste is flattened. It is to be noted that the method for applying the zinc oxide paste onto the ITO film is desirably a doctor blade method, application with a glass rod or the like, a screen printing method, a spray coating method, a gravure printing method, or the like.

Thereafter, the masking tape is separated from the ITO film. Next, the PET film with the zinc oxide paste applied thereto is heated, thereby removing the ethanol in the zinc oxide paste. Thus, a conductive film with porous zinc oxide is obtained.

Next, the conductive film with the porous zinc oxide is immersed in warm water, and then dried, thereby providing a conductive film with modified porous zinc oxide. Next, the conductive film with the modified porous zinc oxide is immersed in a dye solution of D149 dissolved in ethanol. Thereafter, the excess dye solution is removed with ethanol from the conductive film with the modified porous zinc oxide, and the film is subjected to natural drying. Thus, the working electrode substrate 22 can be obtained.

<Preparation of Counter Electrode Substrate 23>

The counter electrode substrate 23 can be obtained by preparing a PET film with an ITO film, and forming a Pt film on the ITO film by a sputtering method.

<Preparation of Dye-Sensitized Solar Cell 20>

Figure 8A:
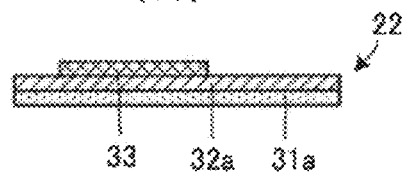
FIGS. 8(A) through 8(D) show cross-sectional views illustrating a method for preparing the dye-sensitized solar cell 20 according to the present embodiment.

FIGS. 8(A)-8(D) and 9(A)-9(C) are cross-sectional views illustrating a method for preparing the dye-sensitized solar cell 20. As shown in FIG. 8(A), the working electrode substrate 22 is prepared by the method described above.

Figure 8B:
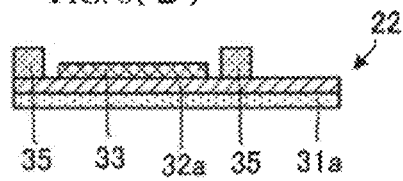
Figure 8C:
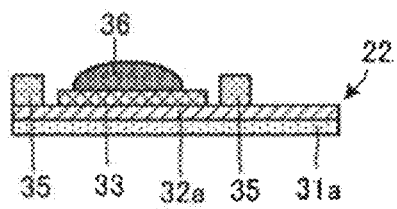

Next, as shown in FIG. 8(B), the sealing material 35 of an ultraviolet curable resin is applied to a predetermined width on an outer periphery of the photoelectric conversion layer 33 of the working electrode substrate 22. Thereafter, as shown in FIG. 8(C), the electrolytic solution 36 of propylene carbonate with 0.05 M iodine and 0.5 M methylimidazolium iodide dissolved therein is delivered by drops in an appropriate amount onto the photoelectric conversion layer 33.

Figure 8D:
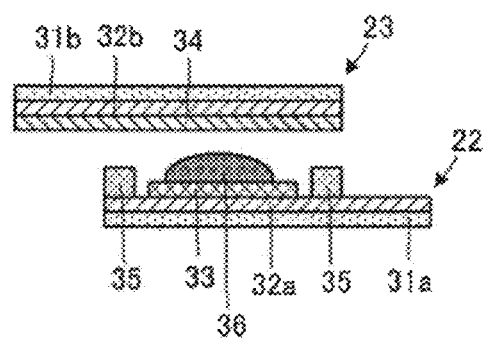
Figure 9A:
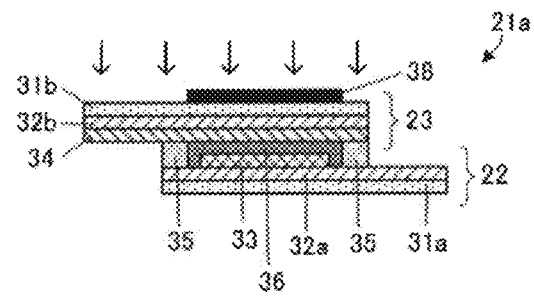
FIGS. 9(A) through (9(C) show cross-sectional views illustrating the method for preparing the dye-sensitized solar cell 20 according to the present embodiment.

Next, as shown in FIG. 8(D), the counter electrode substrate 23 is prepared by the method described above, and the working electrode substrate 22 and the counter electrode substrate 23 are opposed and attached to each other. Thereafter, as shown in FIG. 9(A), with the use of a high-pressure mercury lamp, the working electrode substrate 22 and counter electrode substrate 23 attached to each other are irradiated with ultraviolet ray from the counter electrode substrate 23 side. Only the photoelectric conversion layer 33 is protected from light with aluminum foil 38 which has the same shape as the photoelectric conversion layer 33. Thus, the sealing material 35 is cured, and the solar cell 21a is thus completed.

Figure 9B:
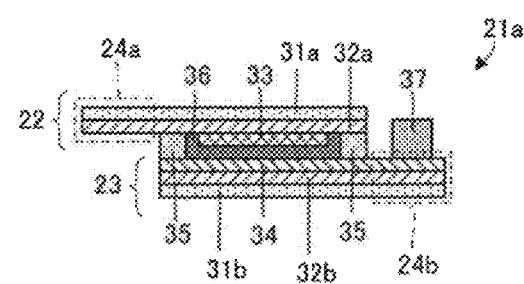
Figure 9C:
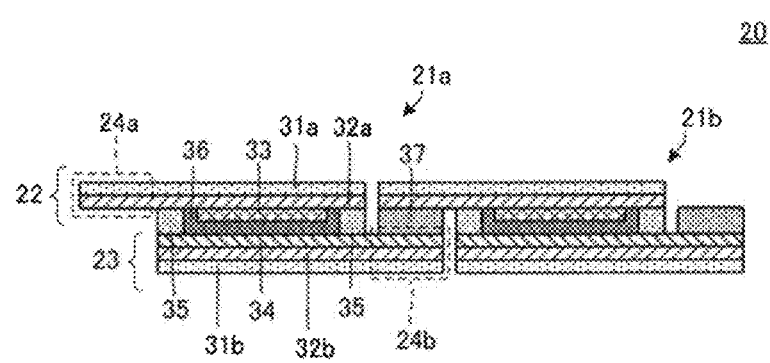

Next, as shown in FIG. 9(B), the conductive adhesive 37 of a conductive double-face tape is provided on the extraction electrode part 24b of the solar cell 21a. thereafter, as shown in FIG. 9(C), the solar cell 21b is prepared in accordance with the same method as in the case of the solar cell 21a. Finally, the extraction electrode part 24b of the solar cell 21a and the extraction electrode part 24a of the solar cell 21b are connected with the conductive adhesive 37.

Thus, the solar cells 21a, 21b are connected in series. The dye-sensitized solar cell 20 is completed by further connecting in series a predetermined number of solar cells required for achieving a desired power-generating voltage.

Figure 10:
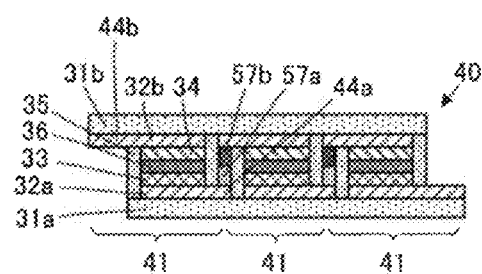
FIG. 10 is a cross-sectional view of a dye-sensitized solar cell 40 according to the present embodiment.

FIG. 10 is a cross-sectional view of a dye-sensitized solar cell 40. For the dye-sensitized solar cell 40, solar cells 41 that have the same structure as the solar cell 21a (see FIG. 7) are formed in line between a base material 31a and a base material 31b. The respective solar cells 41 are connected in series with extraction electrode parts 44a, 44b connected with conductive members 57a, 57b.

The solar cells 41 are formed with the base materials 31a and base materials 31b separated by the sealing materials 35. In the solar cell 41, a conductive film 32a, a photoelectric conversion layer 33, an electrolytic solution 36, a catalyst layer 34, and a conductive film 32b are stacked in this order. The extraction electrode parts 44a, 44b are formed by extending the conductive films 32a, 32b from the wall surfaces of the sealing materials 35.

Next, a method for preparing the dye-sensitized solar cell 40 will be described. FIG. 11 shows cross-sectional views illustrating a method for preparing the dye-sensitized solar cell 40.

<Preparation of Working Electrode Substrate 42>

Figure 11A:
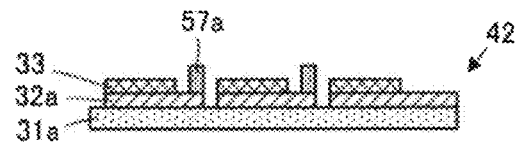
FIGS. 11(A) through 11(D) show cross-sectional views illustrating a method for preparing the dye-sensitized solar cell 40 according to the present embodiment.

First, a PET film with an ITO film is prepared. Next, to a predetermined part on the ITO film, a conductive paste is applied by screen printing, and dried. Next, an unnecessary part of the ITO film is cut off. Laser cutting, a method of removing with an etching solution while a protective film is formed, a method of processing through the application of an etching agent to the unnecessary part, and the like are conceivable as a method for cutting off the ITO film. Next, as in the case of the working electrode substrate 22 (see FIG. 8), a porous zinc oxide film is formed on a predetermined part to make a dye. Thus, the working electrode substrate 42 with the conductive member 57b formed can be obtained as shown in FIG. 11(A).

<Preparation of Counter Electrode Substrate 43>

Figure 11B:
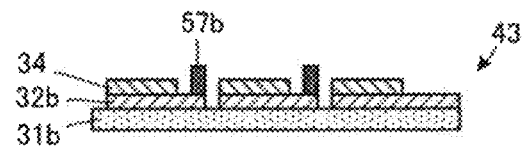

First, a PET film with an ITO film is prepared. As in the case of the working electrode substrate 42, a conductive paste is formed and dried, and an unnecessary part of the ITO film is cut off. Next, on a predetermined part of the ITO film, a Pt film is formed by a sputtering method. Thus, the counter electrode substrate 43 with the conductive member 57b formed can be obtained as shown in FIG. 11(B).

<Preparation of Dye-Sensitize Solar Cell 40>

Figure 11C:
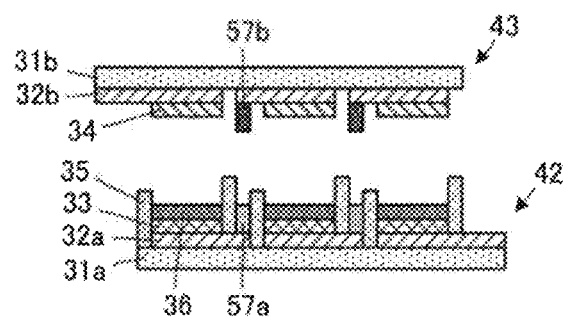
Figure 11D:
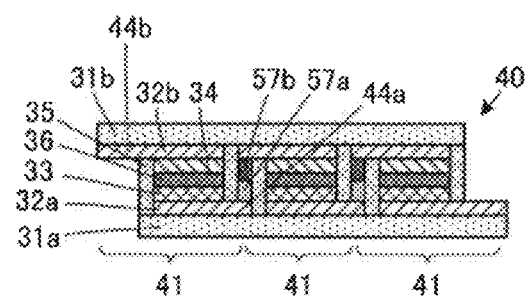

As shown in FIG. 11(C), as in the case of the dye-sensitized solar cell 20, the sealing material 35 is applied to a predetermined width on an outer periphery of the photoelectric conversion layer 33 of the working electrode substrate 42, and the electrolytic solution 36 is delivered by drops in appropriate amount onto the photoelectric conversion layer 33. Next, as shown in FIGS. 11(C) and 11(D), the working electrode substrate 42 and the counter electrode substrate 43 are opposed, and attached to each other. In this regard, the conductive member 57a and the conductive member 57b are attached with a conductive adhesive (not shown). Next, the sealing material 35 and the conductive adhesive are subjected to curing. Thus, the dye-sensitized solar cell 40 is completed.

Figure 12:
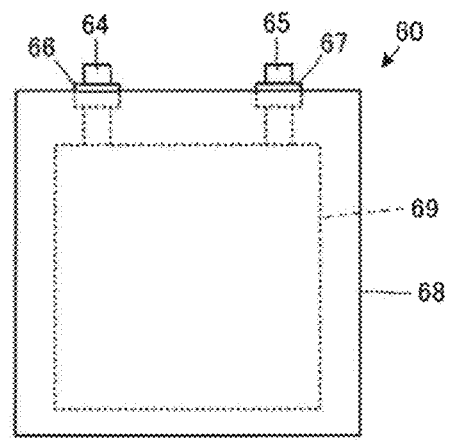
FIG. 12(A) is a plan view of the appearance of a lithium ion secondary battery according to the present embodiment.
FIG. 12(B) is an exploded plan view of a battery element according to the present embodiment.
Figure 12:
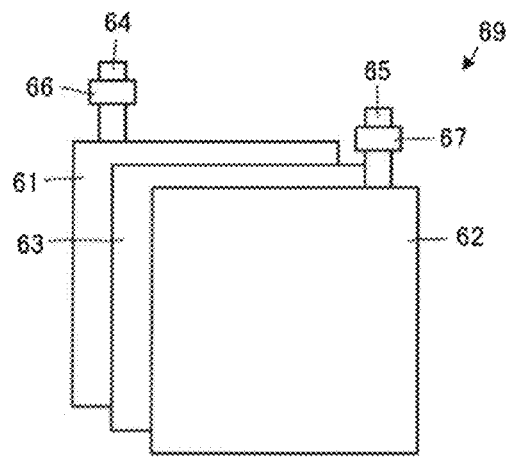

FIG. 12(A) is a plan view of the appearance of a lithium ion secondary battery 60. FIG. 12(B) is a perspective plan view illustrating a battery element 69 of the lithium ion secondary battery 60. The lithium ion secondary battery 60 is formed by enclosing the battery element 69 along with a non-aqueous electrolytic solution (not shown) in an outer package material 68. The battery element 69 includes a positive electrode 61, a negative electrode 62, a separator 63, lead tabs 64, 65, and sealants 66, 67. The positive electrode 61, the negative electrode 62, and the separator 63 have the form of a rectangular flat plate. The positive electrode 61 and the negative electrode 62 are opposed with the separator 63 interposed therebetween.

The positive electrode 61 is provided with the lead tab 64, whereas the negative electrode 62 is provided with the lead tab 65. The lead tab 64 and the lead tab 65 are spaced in a planar view. The lead tabs 64, 65 have ends projected from the outer package material 68. The sealant 66 is attached to the lead tab 64, whereas the sealant 67 is attached to the lead tab 65. The sealants 66, 67 disposed at the boundaries between the inside of the outer package material 68 and the outside of the outer package material 68, prevent the non-aqueous electrolytic solution from leaking through the lead tabs 64, 65 from the outer package material.

The positive electrode 61 is obtained by forming a positive electrode active material layer on a positive electrode current collector. The positive electrode current collector is composed of, for example, aluminum foil or the like. The positive electrode active material layer is composed of a material combination layer including a lithium-transition metal oxide such as a lithium cobalt oxide, a lithium manganese oxide, a lithium nickel oxide, a lithium-nickel-manganese-cobalt oxide, a lithium-manganese-nickel oxide, a lithium-manganese-cobalt oxide, a lithium-nickel-cobalt oxide, and a lithium iron phosphate. The negative electrode 62 is obtained by forming a negative electrode active material layer on a negative electrode current collector. The negative electrode current collector is composed of, for example, aluminum foil or the like. The negative electrode active material layer is composed of a material combination layer including a lithium titanium oxide of spinel-type crystal structure. The positive electrode active material layer and the negative electrode active material layer are desirably 100 μm or less in thickness as described above.

The separator 63 prevents short circuits from being caused by contact between the positive electrode 61 and the negative electrode 62. For example, a porous sheet-like material of polyamideimide, or the like can be used as the separator 63.

For example, 1 mol/L of LiPF6 dissolved in a mixed solvent of propylene carbonate, or the like can be used as the non-aqueous electrolytic solution. In addition, an electrolytic solution can be used which has the following electrolyte dissolved in the following organic solvent. The organic solvent is, for example, dimethyl carbonate, diethyl carbonate, methyl ethyl carbonate, propylene carbonate, acetonitrile, ethyl propionate, methyl propionate, or a mixture thereof, which is used commonly in lithium ion secondary batteries. The electrolyte is LiPF6, LiBF4, LiTFSI, or a mixture thereof. In addition, an electrolytic solution can be also used which has the foregoing organic solvent or electrolyte dissolved in the following ionic liquid. The ionic liquid is, for example, 1-ethyl-3-methylimidazolium tetrafluoroborate, 1-ethyl-3 methylimidazolium bis(trifluoromethanesulfonyl)imide, or a mixture thereof.

Next, a method for preparing the lithium ion secondary battery 60 will be described.

<Preparation of Positive Electrode 61>

A lithium cobalt oxide (LCO) represented by the composition formula LiCoO2, carbon as a conducting agent, and polyvinylidene fluoride (PVDF) as a binder are combined to be 90:7:3 in ratio by weight, and kneaded with N-methyl 2-pyrrolidone (NMP), thereby preparing positive electrode active material slurry.

Then, this positive electrode active material slurry is applied to aluminum foil as a positive electrode current collector so as to reach a predetermined weight, dried, and then subjected to rolling through a roll press, thereby forming a positive electrode active material layer on the positive electrode current collector.

Then, the positive electrode current collector with the positive electrode active material layer formed is subjected to punching so that the plane area is 3 cm2 (a rectangular shape of 20 mm in vertical dimension and 15 mm in horizontal dimension), thereby preparing the positive electrode 61. Further, the positive electrode active material layer has an electrode weight 8.8 mg/cm2 on one side, and the thickness is adjusted with the roll press so that the filling density is all 3.3 g/cm3.

<Preparation of Negative Electrode 62>

A spinel-type lithium-titanium oxide represented by Li4Ti5O12 as a negative electrode active material, and PVDF as a binder are combined to be 90:10 in ratio by weight, and kneaded with NMP, thereby preparing negative electrode active material slurry.

Then, each negative electrode active material slurry is applied to aluminum foil as a negative electrode current collector so as to reach a predetermined weight, dried, and then subjected to rolling through a roll press, thereby forming a negative electrode active material layer on the negative electrode current collector.

Then, the negative electrode current collector with the negative electrode active material layer formed is subjected to punching so that the plane area is 3 cm2 (a rectangular shape of 20 mm in vertical dimension and 15 mm in horizontal dimension), thereby preparing the negative electrode 62. Further, the negative electrode active material layer has an electrode weight 10.0 mg/cm2 on one side, and the thickness is adjusted with the roll press so that the filling density is all 2.0 g/cm3.

<Preparation of Non-Aqueous Electrolytic Solution>

A non-aqueous electrolytic solution is prepared by dissolving 1 mol/L of LiPF6 in a mixed solvent of propylene carbonate.

<Preparation of Lithium Ion Secondary Battery 60>

As shown in FIG. 12(B), the positive electrode 61 prepared by the method described above is provided with the lead tab 64, whereas the negative electrode 62 is provided with the lead tab 65. Then, the positive electrode 61 and the negative electrode 62 are stacked with the porous separator 63 of polyamideimide (air permeability: 10 sec./100 cc, film thickness: 24 μm) therebetween, thereby preparing the battery element 69 including the positive electrode 61, the negative electrode 62, and the separator 63.

Then, after respectively attaching the lead tab 64 and the lead tab 65 with the sealant 66 and the sealant 67, the battery element 69 is housed in the outer package material 68 of a laminate film including an aluminum layer as an interlayer between resin layers, as shown in FIG. 12(B). Thereafter, the non-aqueous electrolytic solution prepared by the foregoing method is injected into the outer package material 68, an opening of the outer package material 68 is then sealed, thereby preparing the lithium ion secondary battery 60. It is to be noted that the outer package material 68 is not limited to a sack-like material that uses a laminate film as described above, but it is possible to use materials in various forms capable of enclosing the battery element along with the non-aqueous electrolytic solution, and it is also possible to use, for example, a material in the form of a can.

Figure 13:
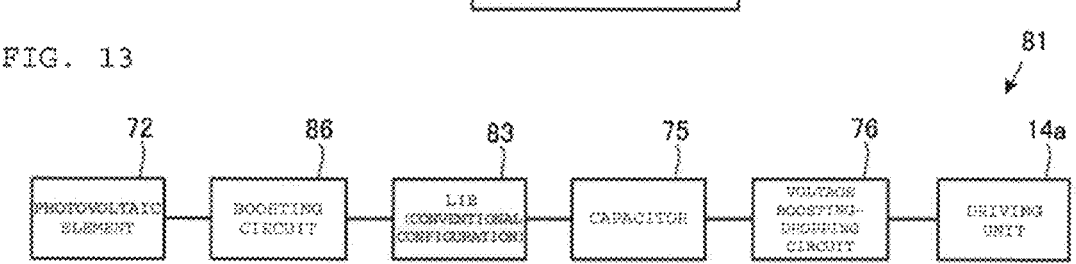
FIG. 13 is a block diagram of a module as a second comparative example.

Next, results of module operation tests will be described. FIG. 13 is a block diagram of a module 81 according to a second comparative example. The module 81 was prepared with the use of a photoelectric conversion element 72, a lithium ion secondary battery 83, and a driven unit 14a. The photoelectric conversion element 72 has five photoelectric conversion element cells (with a power-generating voltage of 0.5 V at 200 lux) connected in series. The conventionally configured lithium ion secondary battery 83 is configured to include, for example, a lithium cobalt oxide as a positive electrode active material and graphite as a negative electrode active material, with a charging voltage of 3.8 V. The driven unit 14a is configured as in FIG. 2, with a driving voltage of 2.2 V.

A boosting circuit 86 for boosting the power-generating voltage of the photoelectric conversion element 72 to the charging voltage of the lithium ion secondary battery 83 was inserted between the photoelectric conversion element 72 and the lithium ion secondary battery 83. A voltage boosting-dropping circuit 76 for converting the discharging voltage of the lithium ion secondary battery 83 to the driving voltage of the driven unit 14a was inserted between the lithium ion secondary battery 83 and the driven unit 14a. A capacitor 75 was inserted in parallel to the lithium ion secondary battery 83, in order to cause an electric current of 20 to 30 mA to flow instantaneously for driving the driven unit 14a.

In the module 81, the boosting circuit 86 and the voltage boosting-dropping circuit 76 consume electric power, thereby leading to a poor power efficiency, and defective operation may be thus caused. In addition, the insertion of the boosting circuit 86, the voltage boosting-dropping circuit 76, and the capacitor 75 increase the size of the module 81.

For a module according to a third comparative example, the number of photoelectric conversion element cells in series is increased from 5 to 8 without changing the area of the photoelectric conversion element, as compared with the photoelectric conversion element 72 according to the second comparative example. The other configuration is the same as the module 81. In the module according to the third comparative example, the power-generating voltage of the photoelectric conversion element 72 is not less than the charging voltage of the lithium ion secondary battery 83, and the need for the boosting circuit 86 is thus eliminated. However, the area of the photoelectric conversion element cell is made 5/8 times as large, and the amount of current in the power generation of the photoelectric conversion element is thus made 5/8 time as large as compared with in the case of the photoelectric conversion element 72. For this reason, in the module according to the third comparative example, the charging rate was decreased as compared with the module according to the second comparative example. As a result, defective operation was also caused in the module according to the third comparative example.

Figure 14:
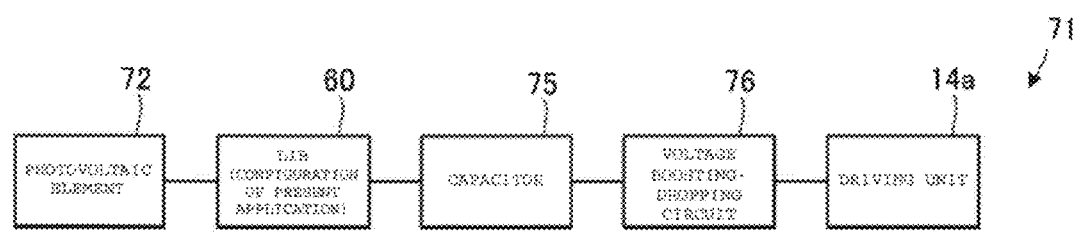
FIG. 14 is a block diagram of a module according to a third example.

FIG. 14 is a block diagram of a module 71 according to a third example. For the module 71 according to the third example, a lithium ion secondary battery 60 was used in place of the lithium ion secondary battery 83 according to the second comparative example, and the boosting circuit 86 according to the second comparative example was removed. The lithium ion secondary battery 60 is prepared in accordance with the method mentioned above, with a charging voltage of 2.3 V. The remaining configuration of the module 71 is the same as the second comparative example. It is to be noted that while the capacitor 75 and the voltage boosting-dropping circuit 76 are not always required for the module 71, the capacitor 75 and the voltage boosting-dropping circuit 76 are inserted for comparisons with the second comparative example and the third comparative example.

The module 71 succeeded in charging the lithium ion secondary battery 60 without using any boosting circuit. The charging efficiency was increased as compared with the module 81 according to the first comparative example, and the charging rate was increased as compared with the module according to the second comparative example. The driven unit 14a operated in a more stable manner without any defective operation.

For a module according to a fourth example, a diode with a breakdown voltage of 5 V was inserted between a photoelectric conversion element 72 and the lithium ion secondary battery 60. The remaining configuration of the module 71 is the same as the module 71 according to the third example. In the module according to the fourth example, electric current was prevented from flowing backward, even when the module was disposed in an extremely dark environment with an illuminance on the order of 0 to 5 1x, and the driven unit 14a has succeeded in being operated in a stable manner.

For a module according to a fifth example, the positive electrode active material layer and negative electrode active material layer of the lithium ion secondary battery 60 were adjusted to 100 μm in thickness, and the capacitor 75 was removed. The remaining configuration of the module is the same as the module 71 according to the third example. The module according to the fifth example made it possible to supply an electric current of 20 to 30 mA from the lithium ion secondary battery 60 to the driven unit 14a without a capacitor 75 interposed therebetween, thereby posing no problem to the operation of the module even when the capacitor 75 was eliminated. Reducing the thicknesses of the positive electrode active material layer and negative electrode active material layer to 50 μm, and to 30 μm made it possible to supply a larger electric current, thereby succeeding in causing the driven unit 14a that requires a larger electric current to operate in a stable manner.

DESCRIPTION OF REFERENCE SYMBOLS

10: charging circuit
11, 11a, 71, 81: module
12, 12a~12c: power generation element
13: electric storage element
14, 14a: driven unit
20, 40: dye-sensitized solar cell
21a, 21b, 41: solar cell
22, 42: working electrode substrate
23, 43: counter electrode substrate
24a, 24b, 44a, 44b: extraction electrode part
31a, 31b: base material
32a, 32b: conductive film
33: photoelectric conversion layer
34: catalyst layer
35: sealing material
36: electrolytic solution
37: conductive adhesive
38: aluminum foil
57a, 57b: conductive member
60, 83: lithium ion secondary battery
61: positive electrode
62: negative electrode
63: separator
64, 65: lead tab 66, 67: sealant
68: outer package material
69: battery element
72: photoelectric conversion element
75: capacitor
76: voltage boosting-dropping circuit
86: boosting circuit
141: sensor
142: radio communication unit
143: microcomputer

The invention claimed is:

1. A charging circuit comprising:
an electric storage element having a rated charging voltage:
a power generation element having a rated power generation voltage which is greater than the rated charging voltage, the power generation element being coupled to the electric storage unit so as to charge the electric storage element; and
the electric storage element having a positive electrode active material layer containing a lithium-transition metal oxide and a negative electrode active material layer containing lithium-titanium oxide having a spinel-type crystal structure.

2. The charging circuit according to claim 1, wherein the rated power-generating voltage of the power generation element falls within the range of 100 to 130% of the rated charging voltage of the electric storage element.

3. The charging circuit according to one claim 1, wherein the power generation element includes a dye-sensitized photoelectric conversion element, an amorphous Si photoelectric conversion element, a compound-semiconductor thin-film photoelectric conversion element, and/or an organic thin-film photoelectric conversion element.

4. The charging circuit according to claim 1, wherein the power generation element is a photoelectric conversion element which when subjected to an illuminance in the range of 50 to 2000 lux generates a power-generating voltage which is at least 60% of the power-generating voltage of the photoelectric conversion element at 2000 lux.

5. The charging circuit according to claim 1, wherein a protection circuit is located between the power generation element and the electric storage element.

6. The charging circuit according to claim 1, wherein the positive electrode active material layer and the negative electrode active material layer are no more than 100 μm in thickness.

7. A module comprising the charging circuit according to claim 1, and a circuit driven by the electric storage element of the charging circuit, the circuit having a rated operating voltage equal to or less than the rated charging voltage of the electric storage element.

8. The module according to claim 7, wherein the circuit comprises a sensor that measures at least one of infrared, magnetism, temperature, humidity, atmospheric pressure, flow rate, illuminance, light, sound waves, odors, and tactile.

9. The module according to claim 7, wherein the circuit comprises a radio communication unit, a storage unit, and a control unit that controls both the radio communication unit and the storage unit.

10. The module according to claim 9, wherein the storage unit stores a personal identification number for identifying the module from other modules.

11. The module according to claim 7, wherein the circuit comprises a display unit, and a control unit that controls the display unit.

* * * * *